United States Patent [19]

Arahara et al.

[11] Patent Number: 5,019,835

[45] Date of Patent: May 28, 1991

[54] IMAGE FORMING APPARATUS AND IMAGE FORMING METHOD USING A NEGATIVE IMAGE INSULATING PATTERN FORMED ON AN ELECTROCONDUCTIVE SUBSTRATE

[75] Inventors: Kohzoh Arahara, Kawasaki; Kenichi Matsumoto, Tokyo; Hiroshi Fukumoto, Kawasaki; Takashi Kai, Hadano; Osamu Hoshino, Ebina; Toshiya Yuasa; Noboru Tohyama, both of Kawasaki; Motokazu Kobayashi, Yokohama, all of Japan

[73] Assignee: Canon Kabushiki Kaisha, Tokyo, Japan

[21] Appl. No.: 416,458

[22] Filed: Oct. 3, 1989

[30] Foreign Application Priority Data

Oct. 4, 1988 [JP] Japan ................................ 63-250169

[51] Int. Cl.[5] ........................ G01D 15/16; B41N 1/16; B41N 3/00

[52] U.S. Cl. ................................ 346/1.1; 346/140 R; 346/135.1; 101/467

[58] Field of Search .................... 346/1.1, 140 R, 150, 346/139 R, 76 PH, 135.1; 101/463.1, 465, 426, DIG. 13, 466, 467

[56] References Cited

U.S. PATENT DOCUMENTS

| | | | |
|---|---|---|---|
| 3,946,671 | 3/1976 | Metcalfe | 101/426 |
| 4,205,320 | 5/1980 | Fujii | 346/1.1 |
| 4,462,035 | 7/1984 | Koto | 346/76 PH |
| 4,838,940 | 6/1989 | Kan . | |
| 4,855,763 | 8/1989 | Kan . | |
| 4,881,084 | 11/1989 | Kan | 346/1.1 |

FOREIGN PATENT DOCUMENTS 0336238 10/1989 European Pat. Off. .

*Primary Examiner*—Benjamin R. Fuller

*Assistant Examiner*—Scott A. Rogers

*Attorney, Agent, or Firm*—Fitzpatrick, Cella, Harper & Scinto

[57] ABSTRACT

An image forming apparatus comprises: an electroconductive substrate; an electroconductive member disposed opposite to the electroconductive substrate; a plate-forming unit for forming an insulating pattern on the electroconductive substrate; a supplier for providing a recording material between the electroconductive substrate and the electroconductive member, the recording material being capable of changing its adhesiveness corresponding to the polarity of a voltage applied thereto; and a voltage source for applying a voltage between the electroconductive substrate and the electroconductive member.

14 Claims, 4 Drawing Sheets

IMAGE FORMING APPARATUS AND IMAGE FORMING METHOD USING A NEGATIVE IMAGE INSULATING PATTERN FORMED ON AN ELECTROCONDUCTIVE SUBSTRATE

FIELD OF THE INVENTION AND RELATED ART

The present invention relates to an image forming apparatus for effecting printing by using an ink which is capable of changing its adhesiveness under the application of a voltage, and an image forming method using such an apparatus.

As the printing process using a conventional ink, there have been known various printing processes such as planographic printing, letterpress printing, and gravure printing. However, in these conventional printing processes, since the production of a printing plate requires complicated steps, the resultant printing plate becomes too expensive, the patterning of an ink between the image portion and non-image portion of the printing plate requires dampening water, and complicated operations are required in order to control the adhesiveness of the ink to the resinous surface of the printing plate. Accordingly, these conventional printing processes have various problems to be solved.

In view of these problems, our research group has proposed an ink capable of changing its adhesiveness corresponding to the application of a voltage (Japanese Laid-Open Patent Application (KOKAI) No. 71359/1988). In an image forming method wherein a desired pattern of voltage is applied to such an ink and the ink is transferred to a transfer-receiving medium corresponding to the pattern, the printing plate used therefor may be prepared relatively easily and the printing steps may be conducted relatively easily. Further, in this image forming method, since the amount of the ink to be transferred may be controlled by the amount of charge passing through the ink, it is not necessary to regulate the amount of the ink by using a large number of rollers which have been used in the conventional printing machine.

In the apparatus used for the above-mentioned image forming method, the above-mentioned pattern of voltage is applied to the ink by means of a conducting (or current-conducting) head. Accordingly, the pattern of change in the ink adhesiveness is formed by using such a conducting head.

SUMMARY OF THE INVENTION

An object of the present invention is to provide an image forming apparatus which rapidly deals with various images by using the above-mentioned ink, and is capable of providing images of good quality.

Another object of the present invention is to provide an image forming method using the above-mentioned image forming apparatus.

According to the present invention, there is provided an image forming apparatus, comprising:

- an electroconductive substrate;
- an electroconductive member disposed opposite to the electroconductive substrate;
- plate-forming means for forming an insulating pattern on the electroconductive substrate;
- means for providing a recording material between the electroconductive substrate and the electroconductive member, the recording material being capable of changing its adhesiveness corresponding to the polarity of a voltage applied thereto; and
- means for applying a voltage between the electroconductive substrate and the electroconductive member.

The present invention also provides an image forming method, comprising the steps of:

- forming an insulating pattern on an electroconductive substrate thereby to prepare a printing plate;
- providing a recording material between the electroconductive substrate and an electroconductive member disposed opposite to the electroconductive substrate, the recording material being capable of changing its adhesiveness corresponding to the polarity of a voltage applied thereto;
- applying a voltage between the electroconductive substrate and the electroconductive member to attach the recording material to either one of the electroconductive substrate and the electroconductive member thereby to form thereon a pattern of the recording material corresponding to the insulating pattern; and
- transferring the pattern of the recording material formed on the electroconductive substrate or electroconductive member to a transfer-receiving medium.

Since the above-mentioned image forming apparatus according to the present invention uses a printing plate comprising an electroconductive substrate and a pattern of an insulating material disposed on the substrate, it may provide an image of better quality as compared with an image forming apparatus wherein a bar-shaped electrode is caused to directly contact an ink.

Further, since the image forming apparatus according to the present invention includes a plate-making (or plate-forming) means, it may deal with various images more rapidly as compared with an apparatus including no plate-making means wherein a printing plate having a pattern fixed thereto is set in a predetermined position and then image formation is effected.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Hereinbelow, an embodiment of the image forming apparatus (and image forming method) according to the present invention is described with reference to the accompanying drawings.

Figure 1:
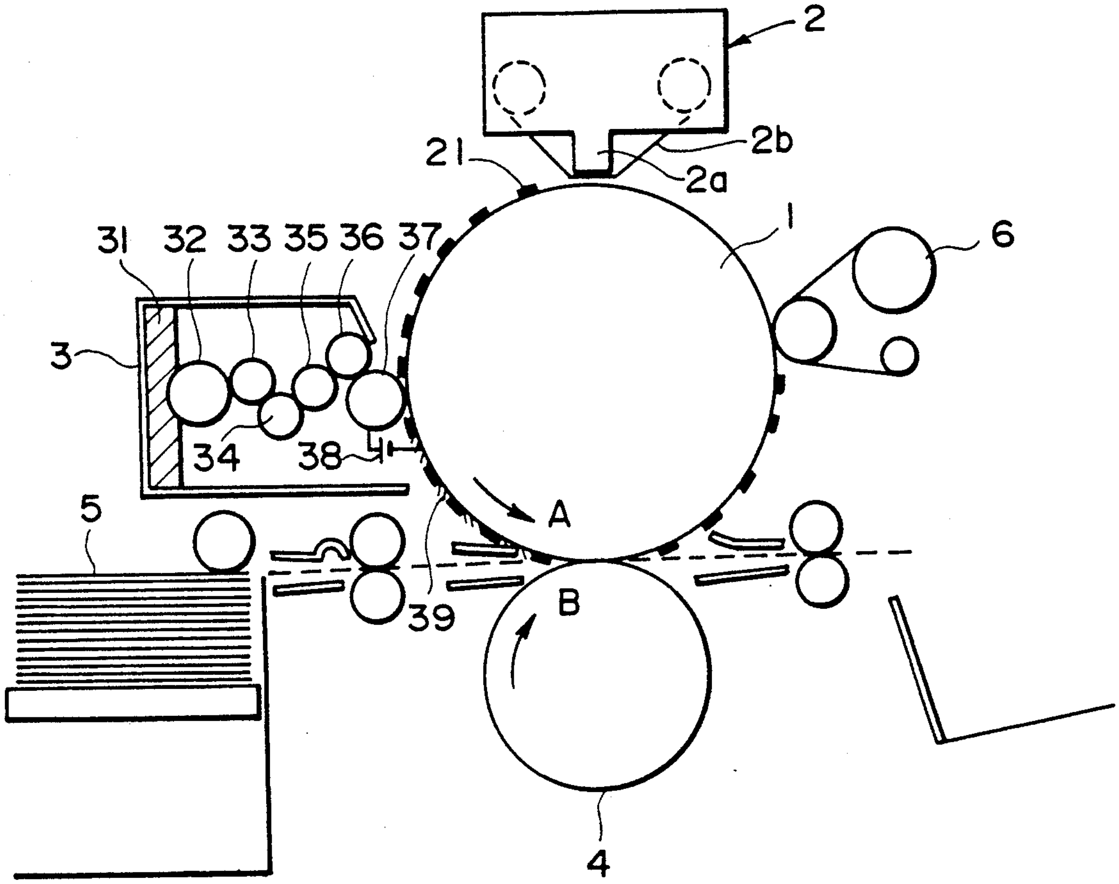
FIGS. 1 are schematic sectional views each showing an embodiment of the image forming apparatus according to the present invention.

Referring to FIG. 1, an electroconductive substrate 1 comprises a member having a cylindrical shape and rotating in the arrow A direction. At least the surface of the electroconductive substrate may preferably comprise an electroconductive material such as metal including aluminum, copper, stainless steel, platinum, etc.

Plate-forming means 2 forms a pattern 21 comprising an insulating material on the electroconductive substrate 1 rotating in the arrow A direction. The plate-forming means 2 may be an ordinary recording device. Specific examples thereof may include: a thermal transfer recording device which is capable of forming an insulating pattern on a substrate by the conventional thermal transfer method by using an insulating ink comprising, e.g., a polymer or wax; an electrophotographic recording device capable of forming a toner image comprising an insulating material on a substrate by an electrophotographic process; and an ink-jet recording device capable of jetting an insulating liquid ink to form an ink pattern on a substrate.

Alternatively, there may be used an image forming device utilizing polymerization. In such a device, e.g., a layer of a polymerizable polymer precursor is formed on the electroconductive substrate 1, light and/or heat is applied to the precursor layer to form therein a pattern image comprising a polymerized portion and an unpolymerized portion; and the unpolymerized portion is removed by etching or peeling thereby to form an insulating pattern comprising the polymerized portion. In a process wherein the unpolymerized portion is removed by peeling, a laminate sensitive material comprising a substrate, and a photosensitive material layer and a PET (polyethylene terephthalate) film disposed in this order on the substrate may for example be used, light is patternwise supplied to the laminate from the PET film side, and then the PET film is peeled from the substrate to selectively leave the exposed portion of the photosensitive layer on the substrate, whereby an image is formed on the substrate.

Further, the plate-forming means can be one which is capable of applying onto the electroconductive substrate 1 an insulating material such as crayon, ink for felt pen or magic marker, and paint comprising an insulating material, thereby to form an insulating pattern on the substrate 1.

In addition, the plate-forming means may include: one which is capable of etching an insulating film formed on the substrate 1 by discharge recording thereby to form an insulating pattern; one which uses a substrate coated with an insulating layer comprising a silver compound and causes silver particles to deposit thereby to form an electroconductive pattern; etc.

In the present invention, an insulating pattern 21 is formed on the electroconductive substrate by using the above-mentioned plate-forming means. Then, referring to FIG. 1, recording material (hereinafter, sometimes referred to as "ink") 31 is applied onto the electroconductive substrate 1 on which the insulating pattern 21 has been formed, by using ink-supplying means 3. The ink-supplying means 3 comprises coating rollers 32, 33, 34, 35, 36 and 37, and at least the surface of each roller comprises an electroconductive material such as metal including aluminum, copper, stainless steel, platinum, etc. Simultaneously with the application of the ink 31 to the substrate 1, a voltage is applied from a power supply 38 between the electroconductive substrate 1 and the coating roller 37 as an electroconductive member, between which the ink 31 is disposed. At this time, the adhesiveness of a portion of the ink 31 contacting the electroconductive substrate 1 is selectively changed, while the adhesiveness of another portion of the ink 31 contacting the insulating pattern 21 is not substantially changed. Based on the resultant difference in the ink adhesiveness, the ink 31 is patternwise attached to the electroconductive substrate 1 to form thereon an ink pattern 39.

In view of practical use, the voltage supplied from the power supply 38 may preferably be a DC voltage of 3—100 V, more preferably 5-80 V, to which an AC bias voltage may be supplemented, as desired.

In FIG. 1, the electroconductive substrate 1 side is a cathode and the coating roller 37 side is an anode, but the electroconductive substrate 1 side may be an anode and the coating roller 37 side may be a cathode depending on the property or state of an ink used in combination therewith.

In the present invention, it is preferred that the voltage from the power supply 38 is applied between the rotation axes of the electroconductive substrate 1 and the coating roller 37.

The thickness of the layer of the ink 31 formed on the coating roller 37 can vary depending on various factors including the gap between the electroconductive substrate 1 and the coating roller 37, the fluidity or viscosity of the ink 31, the surface material and roughness thereof of the coating roller 37, and the rotational speed of the roller 37, but may preferably be about 0.001-10 mm more preferably 0.005-5 mm, particularly preferably 0.01-2 mm as measured at an ink transfer position where the roller 37 is disposed opposite to the electroconductive substrate 1.

If the layer thickness of the ink 31 is below 0.001 mm, it is difficult to form a uniform ink layer on the coating roller 37. On the other hand, if the ink layer thickness exceeds 10 mm, it becomes difficult to convey the ink 31 while keeping a uniform peripheral speed of the surface portion on the side contacting the electroconductive substrate 1 and further it becomes difficult to pass a current between the coating roller 37 and the electroconductive substrate 1.

The thus formed ink pattern 39 on the electroconductive substrate 1 is then transferred to a recording medium (or a medium to be recorded) 5 such as a sheet of paper, cloth or metal, passing between the electroconductive substrate 1 and an impression cylinder 4 which rotates in the arrow B direction while contacting the electroconductive substrate 1 under pressure, whereby an image corresponding to the above-mentioned ink pattern 39 is formed on the recording medium 5.

It is also possible that the ink pattern 39 formed on the electroconductive substrate 1 is once transferred to an intermediate transfer medium such as a blanket cylinder (not shown), and then is again transferred to the recording medium 5 in some cases.

The above-mentioned image formation may be repeated so as to provide a desired number of printed sheets. Thereafter, the insulating pattern 21 which has become unnecessary (and the ink pattern 39 remaining on the electroconductive substrate 1, if any) may be removed or scraped from the electroconductive substrate 1 by means of a cleaner 6 including a web. As a result, the electroconductive substrate 1 may newly be subjected to image formation.

The cleaner 6 used herein is movably disposed so that it does not contact the electroconductive substrate 1 at the time of image formation, but it contacts the electroconductive substrate 1 at the time of cleaning.

In the present invention, there may also be used various cleaning methods including: one wherein the residual material is scraped off with a blade; one wherein the material constituting the insulating pattern 21 is melted and removed by conveying a heated remover member such as paper in contact with the substrate 1; one wherein the residual material is removed with a web impregnated with a solvent.

The image forming apparatus according to the present invention may preferably include the above-mentioned cleaner 6, i.e., means for removing the insulating pattern 21 formed on the substrate 1, but the image forming apparatus according to the present invention is not restricted to such an embodiment. More specifically, the pattern 21 may manually be removed by an operator. Further, there can be used a pattern-removing method wherein a flexible electroconductive sheet is wound about an electroconductive substrate 1 and is used for the formation of an insulating pattern 21, and then such a sheet is thrown away as a disposable means.

Figure 3:
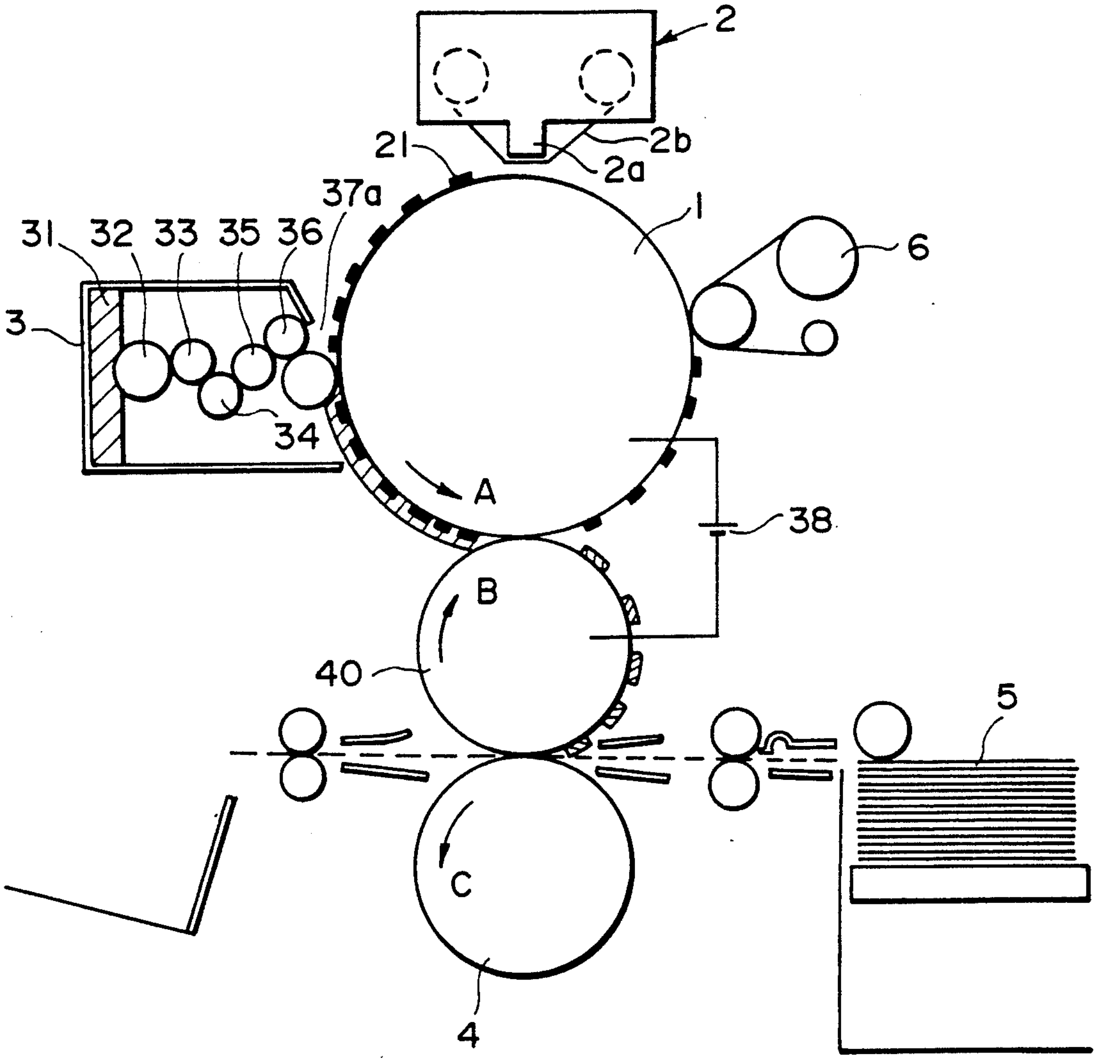

In the image forming apparatus according to the present invention, it is preferred that the coating roller 37 for supplying an ink may also function as a roller for applying a voltage to the ink. However, the image forming apparatus is not restricted to such an embodiment. More specifically, in a case using an ink of a type such that it has an adhesiveness under no application of a voltage and loses the adhesiveness under the application of a voltage, there may be used an embodiment of the apparatus using an intermediate roller 40 as an electroconductive member as shown in FIG. 3. In the apparatus shown in FIG. 3, an ink 31 is uniformly supplied onto the pattern 21 formed on the electroconductive substrate 1 by means of a coating roller 37*a*, and then a voltage is applied between the electroconductive substrate 1 and the intermediate roller 40, whereby the ink is patternwise transferred to the intermediate roller 40.

As described hereinabove, the image forming method according to the present invention uses an ink or recording material capable of changing its adhesiveness corresponding to the polarity of a voltage applied thereto. More specifically, in the image forming method according to the present invention, such an ink is supplied to the clearance between an electroconductive substrate having a desired insulating pattern and an electroconductive member (e.g., an intermediate roller 40 as shown in FIG. 3) disposed opposite thereto, and a voltage is applied between the above-mentioned electroconductive substrate 1 and the electroconductive member, thereby to change the adhesiveness of the ink corresponding to the above-mentioned insulating pattern.

Accordingly, the image-forming method according to the present invention may be classified into the following two modes depending on the property of an ink used therein.

(I) A mode wherein the ink has an adhesiveness under no voltage application, and the ink loses its adhesiveness when a voltage is applied thereto. In such a mode, the ink adheres to the insulating portion of a printing plate to form a desired ink pattern, which is then transferred to a transfer-receiving medium such as a recording medium or an intermediate transfer medium to form thereon a desired recorded image.

(II) A mode wherein the ink has substantially no adhesiveness under no voltage application, and the ink has an adhesiveness when a voltage is applied thereto. In such a mode, the ink adheres to the electroconductive portion of a printing plate to form a desired ink pattern, which is then transferred to a recording medium, etc. to form thereon a desired recorded image.

Hereinbelow, there will be described an ink to be used in the image-forming method according to the present invention.

Whether the ink is initially caused to have an adhesiveness or not, as described in the above-mentioned mode (I) or (II), may easily be controlled by regulating the composition or proportion of materials constituting the ink, or kinds of these materials.

On the other hand, there may be utilized the following three embodiments in connection with an ink composition, with respect to mechanisms wherein an adhesive ink is converted into an adhesive state or a non-adhesive ink is converted into an adhesive state under the application of a voltage.

(1) An embodiment wherein the adhesiveness of an ink is changed on the basis of Coulomb force under voltage application.

In such an embodiment, an ink basically comprising inorganic or organic fine particles and a liquid dispersion medium is used, and a difference in chargeability of the fine particles is utilized.

More specifically, in a case where an ink is prepares so that it initially has an adhesiveness and negatively chargeable fine particles (i.e., those capable of being easily charged negatively) are contained in the ink, the ink on the cathode side becomes non-adhesive to the cathode when a voltage is applied to the ink. In a case where an ink is prepared so that it initially has an adhesiveness and positively chargeable fine particles (i.e., those capable of being easily charged positively) are contained in the ink, the ink on the anode side becomes non-adhesive to the anode when a voltage is applied to the ink.

Alternatively, an ink is prepared so that it is initially non-adhesive and negatively chargeable fine particles are contained therein, the ink on the anode side becomes adhesive to the anode under voltage application. In the case where an ink is prepared so that it is non-adhesive and positively chargeable fine particles are contained therein, the ink on the cathode side becomes adhesive to the cathode under voltage application.

(2) An embodiment wherein an ink is subjected to electrolysis to generate a gas on the basis of electric conduction due to voltage application, whereby the adhesiveness of the ink is changed.

In such an embodiment, an ink is prepared so that it initially has an adhesiveness, and the ink is disposed between an anode and cathode and supplied with a voltage to pass a current therethrough whereby the ink becomes non-adhesive to either one electrode of the anode or cathode.

The reason for the above-mentioned selective non-adhesiveness may be considered that electrolysis occurs due to electric conduction in the vicinity of an electrode and a gas such as hydrogen gas and oxygen gas is generated, whereby the ink becomes non-adhesive to either one of the anode and cathode at which a larger amount of the gas is generated.

The ink to be used in such an embodiment selectively becomes non-adhesive to either one of the anode and cathode, whereby with respect to a portion of an ink layer supplied with a voltage, almost the whole ink layer along the thickness direction is transferred to, e.g., a coating roller 37 shown in FIG. 1 (hereinafter such transfer of an ink is referred to as "bulk transfer").

For example, the generation of a gas in an hydroxyl group (—OH)-containing solvent based on electrolysis due to electric conduction, or the generation of a gas in water based on electrolysis due to electric conduction may be considered as follows:

On the cathode side:

$$2ROH^+ + 2e^- \rightarrow H_2\uparrow + 2RO^-$$

(One mole of hydrogen gas is generated.)
(In the case of water):

$$2H^+ + 2e^- \rightarrow H_2\uparrow$$

(One mole of hydrogen gas is generated.)
On the anode side:

$$2ROH \rightarrow 2RCHO + 2H^+ + 2e^-$$

(In the case of water):

$$2OH^- \rightarrow h_2O + 1/2O_2\uparrow + 2e^-$$

(½ mole of oxygen gas is generated.)

As shown in the above formulas, the amount of generated gas is proportional to the amount of electrons ($e^-$), i.e., the magnitude of an electric current, and the gas is generated only on the cathode side (in the case of the hydroxyl group-containing solvent other than water), or the gas is generated on the cathode side in an amount which is two times that of the gas generated on the anode side. In other words, when the difference in the amount of the generated gas is not smaller than a certain value, the ink becomes non-adhesive to either one electrode (e.g., cathode in the case expressed by the above-mentioned formulas).

In order to cause the ink to generate a gas due to electrolysis, a solvent such as water, alcohol and glycol; or a solvent containing an electrolyte such as sodium chloride and potassium chloride dissolved therein, is contained in the ink. The electric resistance of the ink may preferably be as low as possible. More specifically, the volume resistivity of the ink may preferably be $10^5$ ohm.cm or below. If the volume resistivity exceeds $10^5$ ohm.cm, the quantity of electric conduction becomes too small, or a high voltage is required in order to prevent a decrease in the quantity of electric conduction.

(3) An embodiment wherein a crosslinked structure of an ink or the dissociative state of an electrolyte contained therein is changed by an electrochemical reaction on the basis of electric conduction due to voltage application, whereby the adhesiveness of the ink is changed.

In such an embodiment, the ink may be prepared so that it is initially non-adhesive, or initially has an adhesiveness. When the ink is prepared so that it initially has substantially no adhesiveness, at least a part of the crosslinked structure is changed or destroyed, and the ink is converted from a gel-like state to a sol-like state, whereby the ink is imparted with an adhesiveness. Alternatively, the dissociative state of the electrolyte constituting the ink is changed whereby the ink is imparted with an adhesiveness.

When the ink is prepared so that it initially has an adhesiveness, the adhesive ink becomes non-adhesive by the mechanism reverse to that as mentioned above.

It is considered that the mechanism of the image-forming method according to the present invention is any one of the above-mentioned three mechanisms (1), (2) and (3). It is possible that the mechanism of the image-forming method is a combination of two or more of the above-mentioned three mechanisms.

With respect to the transfer of an ink to the insulating or non-insulating portion of a printing plate, it is supposed that there occurs the above-mentioned bulk transfer or partial transfer wherein a portion of the surface layer of the ink is transferred, depending on the relationship among adhesion forces at the respective interfaces and the cohesive force in the ink.

Hereinbelow, there is described an ink wherein the adhesiveness is changed by the above-mentioned mechanism (1) and (2).

The ink used in the present invention may be one having an adhesiveness or one having substantially no adhesiveness under no voltage application, but the ink having an adhesiveness under no voltage application is preferred in view of the provision of good images because almost all of such an ink corresponding to a non-image portion may easily moved to an electroconductive member (e.g., coating roller) or an electroconductive substrate (e.g., a printing plate as shown in FIG. 3).

If the ink according to the present invention is a liquid having a low viscosity such as water and alcohol, the cohesive force is weak, whereby it is difficult to obtain a suitable adhesiveness.

More specifically, the ink according to the present invention may preferably satisfy at least one of the following properties.

(1) Adhesiveness

A sample ink (reflection density: 1.0 or larger) is caused to adhere to a stainless steel plate of 1 cm×1 cm in size coated with platinum plating which is vertically disposed, so that a 2 mm-thick ink layer is formed on the stainless steel plate, and is left standing as it is for 5 sec. in an environment of a temperature of 25° C. and a moisture of 60%. Then, the height of the ink layer is measured. Through the measurement, the ink according to the present invention may preferably be held on the stainless steel plate substantially. More specifically, the above-mentioned height of the ink layer may preferably be 50% or more, more preferably 80% or more, based on the original height thereof.

(2) Adhesiveness under no voltage application

A 2 mm-thick layer of a sample ink is sandwiched between two stainless steel plates each of 1 cm×1 cm in size coated with platinum plating which are vertically disposed, and the stainless steel plates are separated from each other at a peeling speed of 5 cm/sec under no voltage application. Then, the areas of both plates covered with the ink are respectively measured. Through the measurement, in the ink according to the present invention, the respective plates may preferably show substantially the same adhesion amount of the ink. More specifically, each plate may preferably show an area proportion of 0.7-1.0, in terms of the proportion of the area measured above to the area of the plate which has originally been covered with the above-mentioned 2 mm-thick ink layer.

(3) Adhesiveness under voltage application

A sample ink (reflection density: 1.0 or larger) is applied on a stainless steel plate of 1 cm×1 cm coated with platinum plating to form an about 2 mm-thick ink layer, and another stainless steel plate coated with platinum plating having the same size as described above is, after the reflection density thereof is measured, disposed on the ink layer, and these two stainless steel plates are vertically disposed. Then, a voltage of +30 V was applied between the above-mentioned two stainless steel plates sandwiching the 2 mm-thick ink layer, while one of the stainless steel plate is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the reflection density of each stainless steel plate surface is measured to determine the increase in reflection density of the stainless steel plate. Through the measurement, in the ink according to the present invention, it is preferred that the coloring content of the ink is not substantially transferred to one of the above-mentioned two electrodes, and the ink selectively adheres to the other electrode. More specifically, with respect to the electrode to which substantially no ink adheres, the increase in the reflection density may preferably be 0.3 or smaller, more preferably 0.1 or smaller, when the above-mentioned ink per se has a reflection density of 1.0 or larger.

The ink according to the present invention of which adhesiveness is changed by the above-mentioned mechanism (1) and (2) basically comprises inorganic or organic fine particles and a liquid dispersion medium. The fine particles contained in the ink improve the cutting property of the ink and enhance the image resolution provided thereby. The ink according to the present invention is an amorphous solid in the form of a colloid sol and is a non-Newtonian fluid with respect to its fluidity.

When the ink adhesiveness is changed due to Coulomb force, charged or chargeable fine particles may be used as the entirety or a part of the above-mentioned fine particles and are mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can easily be charged by triboelectrification.

Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2Si_2O_5$, mesortisilicic acid $H_4Si_3O_3$, mesotetrasilicic acid $H_6Si_4O_{11}$; polyamide resin particles; polyamide-imide resin particles; etc.

Examples of the particles to be supplied with a negative charge may include: iron hydroxide particles, aluminum hydroxide particles, fluorinated mica particles, polyethylene particles, motmorillonite particles, fluorine-containing resin particles, etc.

Further, polymer particles containing various charge-controlling agents used as electrophotographic toners (positively chargeable or negatively chargeable) may be used for such a purpose.

The above-mentioned fine particles may generally have an average particle size of 100 microns or smaller, preferably 0.1–20 microns, more preferably 0.1–10 microns. The fine particles may generally be contained in ink in an amount of 1 wt. part or more, preferably 3–90 wt. parts, more preferably 5–60 wt. parts, per 100 wt. parts of the ink.

Examples of the liquid dispersion medium used in the present invention may include: water, methanol, ethanol, ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric amide, 2-nitropropane, nitroethane, $\gamma$-butyrolactone, propylene carbonate 1,2,6-hexanetriol, dipropylene glycol, hexylene glycol, etc. These compounds may be used singly or as a mixture of two or more species as desired. The liquid dispersion medium may preferably be contained in an amount of 40–95 wt. parts, more preferably 60–85 wt. parts, per 100 wt. parts of the ink.

In a preferred embodiment of the present invention, in order to control the viscosity of the ink, a polymer soluble in the above-mentioned liquid dispersion medium may be contained in an amount of 1–90 wt. parts, more preferably 1–50 wt. parts, particularly preferably 1–20 wt. parts, per 100 wt. parts of the ink material.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and liquid polymer such as polybutene.

In a case where the adhesiveness of the ink is changed by the generation of a gas due to electrolysis, the liquid dispersion medium may preferably comprise: water, an alcohol such as methanol and ethanol; a solvent having a hydroxyl group such as glycerin, ethylene glycol and propylene glycol; or a solvent wherein an electrolyte such as sodium chloride and potassium chloride is dissolved. The contents of the liquid dispersion medium and fine particles are the same as described above.

Particularly, water or an aqueous solvent may preferably be used as the liquid dispersion medium, because hydrogen gas is liable to be generated at the cathode side. When water and another liquid dispersion medium are mixed, the water content may preferably be 1–80 wt. parts, more preferably 5–60 wt. parts, per 100 wt. parts of the ink.

In the case of the ink capable of generating a gas due to electrolysis, the fine particles contained in the ink may preferably be, e.g., silica, carbon fluoride, titanium oxide or carbon black, in addition to those as described hereinabove.

In a preferred embodiment of the present invention, in view of the viscoelastic characteristic of the ink, the entirety or a part of the fine particles comprise swelling particles (i.e., particles capable of being swelled) which are capable of retaining the above-mentioned liquid dispersion medium therein.

The "swelling particles" used herein refer to particles having a property such that when they are mixed with a solvent, they incorporate the solvent in their internal structure to be swelled. On the other hand ordinary particles other than the swelling particles do not incorporate a solvent in their internal structure.

More specifically, the swelling particles used in the present invention may preferably show "liquid absorption" as defined below, in the range of 1 ml–1000 ml, more preferably 20 ml–500 ml. The liquid adsorption may be measured in the following manner.

A liquid dispersion medium such as water used in the ink is gradually added to 1 g of powder of the above-mentioned swelling particles while kneading the resultant mixture. The state of the powder is observed and there is found an amount (or a range of amount) of the liquid dispersion medium in which the powder is converted from a dispersed state into the state of a mass, and the mass substantially retains the liquid dispersion medium. At this time, the amount of the liquid dispersion medium added to the powder is the "liquid absorption".

Examples of the material constituting such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica and Li-taeniolite; synthetic mica, silica, etc.

The above-mentioned fluorinated mica may be represented by the following general formula (1).

$$W_{1\text{-}\frac{1}{3}}(X,Y)_{2.5\text{-}3}(Z_4O_{10})F_2$$

wherein W denotes Na or Li; X and Y respectively denote an ion having a coordination number of 6, such as $Mg^{2+}$, $Fe^{2+}$, $Ni^2$, $Mn^{2+}$, and $Li^+$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in their dry state, may preferably have an average particle size of 75 microns or smaller, more preferably 0.8–15 microns, particularly preferably 0.8–8 microns. The content of the swelling particles may preferably be 15–65 wt. parts, more preferably 20–50 wt. parts per 100 wt. parts of the ink.

The ink according to the present invention may contain as desired, a colorant comprising a dye or pigment generally used in the field of printing or recording, such as carbon black. When the ink contains a colorant, the colorant content may preferably be 0.1–40 wt. parts, more preferably 1–20 wt. parts, per 100 wt. parts of the ink. Instead of or in combination with the colorant, a color-forming compound capable of generating a color under voltage application can be contained in the ink. The ink may further contain an electrolyte capable of providing electroconductivity to the ink, a thickening agent (or viscosity improver), a viscosity-reducing agent, or a surfactant. It is also possible to cause the above-mentioned fine particles per se to function as a colorant.

In order to obtain the ink according to the present invention, a liquid dispersion medium and fine particles as mentioned above may for example be mixed in an ordinary manner.

Next, there is described an ink of which adhesiveness is changed by the above-mentioned mechanism (3).

The ink used in the present invention may comprises a crosslinked substance (inclusive of polyelectrolyte) impregnated with a liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing an inorganic ion such as borate ion, and the additive. Further, the term "crosslinked structure " refers to a three-dimensional structure having a crosslinkage or crosslinking bond. The crosslinkage may be composed of any one or more of covalent bond, ionic bond, hydrogen bond and van der Waal's bond.

In the ink used in the present invention, the crosslinked structure is only required to be such that a desired degree of liquid dispersion medium-retaining property is given thereby. More specifically, the crosslinked structure may be any one of a network, a honeycomb, a helix, etc., or may be an irregular one The liquid dispersion medium in the ink used in the present invention may be any inorganic or organic liquid medium which is liquid at room temperature. The liquid medium should preferably have a relatively low volatility, e.g., one equal to or even lower than that of water.

In case where a hydrophilic dispersion medium such as water and an aqueous medium is used as the liquid dispersion medium, the crosslinked substance may preferably be composed of or from a natural or synthetic hydrophilic high polymer or macromolecular substance.

Examples of such a polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

The hydrophilic polymer may preferably be used in a proportion of 0.2–50 wt. parts, particularly 0.5–30 wt. parts, with respect to 100 wt. parts of the liquid dispersion medium.

In the ink used in the present invention, a polyelectrolyte may preferably be used as the above-mentioned crosslinked substance. The "polyelectrolyte" used herein refers to a polymer or macromolecular substance having a dissociative group in the polymer chain (i.e., main chain or side chain) thereof.

Examples of the polyelectrolyte capable of providing a poly ion when dissociated in water may include, e.g., natural polymers such as alginic acid and gelatin; and synthetic polymers obtained by introducing a dissociative group into ordinary polymers, such as polystyrenesulfonic acid and polyacrylic acid. Among these polyelectrolytes, amphoteric polyelectrolytes capable of being dissociated as either an acid or a base, such as a protein may preferably be used, in order to obtain a desired change in the ink adhesiveness based on electric conduction.

On the other hand, when oil such as mineral oil or an organic solvent such as toluene is used as the liquid dispersion medium, the crosslinked substance may be composed of or from one or a mixture of two or more compounds selected from metallic soaps inclusive or metal stearates, such as aluminum stearate, magnesium stearate, and zinc stearate, and, similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters. The crosslinked substances may be used in the same manner as the above-mentioned hydrophilic polymers.

When the hydrophilic polymer, polyelectrolyte or metallic soap, etc., is used, the layer-forming property and liquid dispersion medium —retaining ability of the resultant ink vary to some extent depending on the formulation of these components or combination thereof with a liquid dispersion medium. It is somewhat difficult to determine the formulation or composition of these components in a single way. In the present invention, it is preferred to reduce the amount of a solvent contained in the ink or to enhance the crosslinking degree of the crosslinked substance, in order to obtain an ink which comprises a liquid dispersion medium and a crosslinked substance or polyelectrolyte and has substantially no adhesiveness. On the other hand, in order to obtain such ink having an adhesiveness, it is preferred to increase the amount of a solvent contained in the ink, in a manner reverse to that as mentioned above, or to reduce the crosslinking degree of the crosslinked substance.

The ink capable of changing its adhesiveness by the above-mentioned mechanism (3) essentially comprises a liquid dispersion medium and a crosslinked substance (inclusive of polyelectrolyte), as described above, and may further comprise, as desired, a colorant inclusive of dye, pigment and colored fine particles, a color-forming compound capable of generating a color under electric conduction, an electrolyte providing an electroconductivity to the ink, or another additive such as an antifugal agent or an antiseptic.

The colorant or coloring agent may be any of dyes and pigments generally used in the field of printing and recording, such as carbon black.

Further, in order to enhance the rubbing resistance of the resultant image, fine particles of an inorganic compound such as colloidal silica, titanium oxide and tin oxide may be added to the ink.

The ink used in the present invention may be obtained from the above components, for example, by uniformly mixing a liquid dispersion medium such as water, a crosslinked substance such as a hydrophilic polymer and/or an polyelectrolyte, and also an optional additive such as a crosslinking agent, a colorant, an electrolyte, etc., under heating as desired, to form a viscous solution or dispersion, which is then cooled to be formed into a gel state.

When colored particles such as toner particles are used as a colorant, it is preferred that a crosslinked substance and/or an polyelectrolyte, and a liquid dispersion medium are first mixed under heating to form a uniform liquid, and then the colored particles are added thereto. In this case, it is further preferred that the addition of the particles is effected in the neighborhood of room temperature so as to avoid the agglomeration of the particles.

The thus obtained ink, when subjected to electric conduction, is at least partially subjected to a change in or destruction of the crosslinked structure to be reversibly converted from a gel state into a sol state, whereby it is selectively imparted with an adhesiveness corresponding to a pattern of the electric conduction. Alternatively, the dissociation state of the polyelectrolyte contained in the ink may change, whereby the ink is selectively imparted with an adhesiveness corresponding to the electric conduction.

When the above-mentioned ink capable of changing its adhesiveness by the mechanism (3) is subjected to electric conduction, the pH value of the ink in the neighborhood of an electrode may be changed by an electrochemical reaction. More specifically, the crosslinked structure or dissociative state of an electrolyte may be changed by electron transfer due to the electrode, thereby to change the ink adhesiveness.

According to out knowledge, e.g., when a polyvinyl alcohol crosslinked with borate ions is used as the crosslinked substance, the change in the crosslinked structure caused by a pH change may be considered as follows.

Thus, when the crosslinking borate ion bonded to the —OH groups of the polyvinyl alcohol,

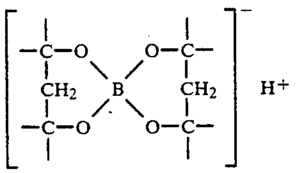

is subjected to an anodic reaction in the neighborhood of an anode (or the addition of an electron acceptor such as hydrochloric acid), the pH of the ink is changed to the acidic side and electrons may be removed from the above-mentioned borate ion to destroy at least a part of the crosslinked structure, the molecular weight is decreased and the viscosity is lowered, whereby the ink may be imparted with an adhesiveness selectively. The reaction at this time may presumably be expressed by the following formula:

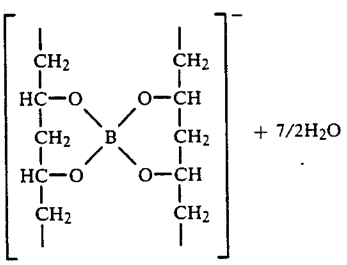

-continued

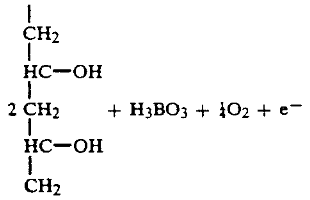

Further, there is explained an embodiment wherein a change in the dissociation condition of a polyelectrolyte based on electric conduction is utilized with reference to an amino acid.

When the pH of the ink is changed to the basic side due to the cathodic reaction in the neighborhood of a cathode based on electric conduction (or the addition of an electron donor), an $—NH_3^+$ group of the amino acid is changed to an $—NH_2$ group. On the other hand, when the pH of the ink is changed to the acidic side due to the anodic reaction in the neighborhood of an anode based on electric conduction (or the addition of an electron acceptor), a —COO— group of the amino acid is changed to a —COOH group. Because of such change in the dissociation condition of the amino acid, a change in the crosslinked structure (or a charge in pH) occurs whereby a difference in the ink adhesiveness is provided.

According to out knowledge, the reaction at this time may presumably be expressed by the following formula:

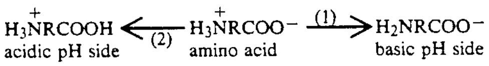

(1): cathodic reaction based on electric conduction
(2): anodic reaction based on electric conduction As described hereinabove, in the present invention, since there is used a recording material or ink capable of changing its adhesiveness corresponding to the polarity of a voltage applied thereto, any plate-forming means can be used without particular limitation, as long as it may provide a pattern comprising an insulating portion and an electroconductive portion on a desired substrate. As a result, the present invention provides an image forming apparatus and an image forming method wherein complicated plate-making steps required for the conventional printing process may be omitted.

Since the image forming apparatus according to the present invention includes both of plate-forming means and printing means which are capable of successively conducting plate-forming and printing steps, it may rapidly provide various printed images.

Since the image forming apparatus and method according to the present invention are capable of forming an image by utilizing a change in the adhesiveness of a recording material corresponding to the polarity of a voltage applied thereto, they may provide good images under various environmental conditions and may be handled very easily.

Further, in the present invention, a printing plate having a pattern is caused to retain a recording material corresponding to the pattern, whereby high-quality images substantially free of distortion may be obtained.

Hereinbelow, the present invention will be explained in more deterial with reference to Examples.

Example 1

Preparation of ink 200 g of glycerin and 140 g of lithium taeniolite ($LiMg_2Li(Si_4O_{10})F_2$) having an average particle size of 2.5 microns were kneaded in a homogenizer at 10,000 rpm for 30 min., and then 200 g of water was added thereto and mixed by means of a roll mill to prepare a gray colloid sol ink in the form of an amorphous solid. The resultant ink had a volume resistivity of 1243 ohm.cm.

The thus obtained ink was applied on a stainless steel plate or board of 1 cm×1 cm plated with platinum to form an about 2 mm-thick ink layer, and another stainless steel plate plated with platinum having the same size as described above was disposed on the ink layer. Then, these two stainless steel plates were disposed vertically. Under no voltage application, when the spacing between these two stainless steel plates was gradually increased to separate these two stainless steel plates from each other, it was found that the ink adhered to almost the whole areas of the respective plates.

Then, a voltage of +30 V was applied between the above-mentioned two stainless steel plates plated with platinum sandwiching the 2 mm-thick ink layer, while one of the stainless steel plates was used as a cathode (earth) and the other was used as an anode. When the spacing between these two stainless steel plates was gradually increased to separate these two stainless steel plates from each other, while applying the voltage in the above-mentioned manner, it was found that substantially all of the ink adhered to the anode while substantially no ink adhered to the cathode, when these electrodes were observed with the naked eyes.

Image formation

Figure 2:
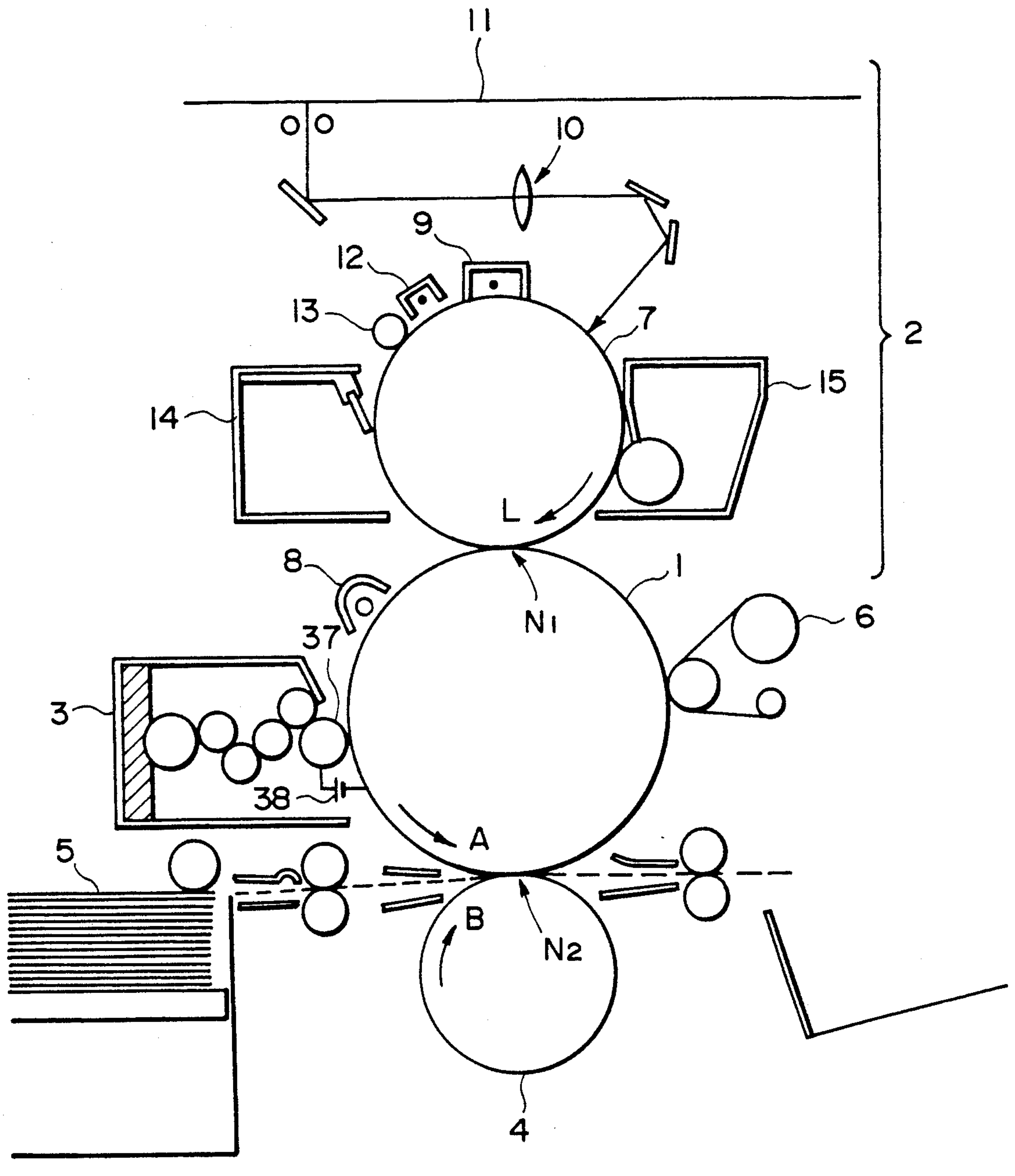

FIG. 2 shows an embodiment of the image forming apparatus according to the present invention which uses an electrophotographic recording device 2 (a modification of an electrophotographic copying machine NP-8580, mfd. by Canon K.K.) as means for forming an insulating pattern. The electrophotographic device 2 used herein comprises a photosensitive cylindrical member 7 having a diameter of 110 mm and a corona charger 9, a developing device 15, a cleaner 14, a discharger 13, an optical discharger 12 which are disposed in this order around the photosensitive member 7. In the device 2, reflected light from an original (not shown) disposed on a mounting member 11 is passed through an lens array 10 to the surface of the photosensitive member 7.

In the electrophotographic device 2 used in this instance, the photosensitive member 7 comprised amorphous silicon (copying speed (or peripheral speed of the photosensitive member)=270 mm/sec) on which a latent image having a light part potential of +50 V and a dark part potential of +750 V had been formed, the sleeve contained in the developing device 15 had a diameter of 32 mm, the magnetic flux density at the surface of the sleeve was 1000 gauss with respect to the direction perpendicular to the sleeve surface, a developer layer formed on the sleeve surface had a thickness of 0.2 mm, the clearance between the sleeve and the photosensitive member 7 was 0.3 mm, and the developing bias applied to the sleeve was a superposition of a DC component of +200 V and an AC component of 3.0 KHz and 1.4 KVpp.

The developer used herein was prepared in the following manner.

| | |
|---|---|
| Styrene monomer | 3200 wt. parts |
| Cyclized rubber (Albex CR450, mfd. by Hoechst Japan, K.K.) | 400 wt. parts |
| Bontoron E 81 (charge controller, mfd. by Orient Kagaku Kogyo K.K.) | 80 wt. parts |
| 2-Ethylhexyl methacrylate monomer | 760 wt. parts |
| Polyethylene glycol dimethacrylate | 40 wt. parts |
| Carbon black (STERING R, mfd. by Cabot Co., U.S.A.) | 600 wt. parts |
| Paraffin wax 155° F. (mfd. by Nihon Seiro K.K., softening point = 69° C.) | 160 wt. parts |

The above ingredients were mixed at 80° C. for 4 hours by means of an attritor to prepare a monomer composition.

254 wt. parts of the thus obtained monomer composition was charged in an aqueous medium comprising 1200 wt. parts of distilled water containing 20 wt. parts of amino-modified silica (obtained by treating 100 wt. parts of Aerosil #200 mfd. by Nihon Aerosil K.K. with 5 wt. parts of aminopropyltriethoxysilane) and 25 wt. parts of 0.1N-hydrochloric acid and heated to 85° C., under stirring by means of a TK-homomixer, and stirred at 10,000 rpm for 15 min. to form particles through dispersion.

After the formation of the particles, the temperature of the dispersion was lowered to 60° C., and a polymerization initiator comprising 4 wt. parts of 2,2'-azobis-(2,4-dimethylvaleronitrile) and 2 wt. parts of 2,2'-azobisisobutyronitrile was added to the aqueous medium and the resultant mixture was stirred for 30 min. Further, the stirrer was replaced by a paddle blade stirrer and stirring was conducted at 60° C. for 10 hours to complete the polymerization.

The aqueous medium containing the thus obtained polymer particles was cooled; and the particles were washed with a sodium hydroxide solution to remove the amino-modified silica through dissolution thereof, washed with water, dehydrated and dried, and classified thereby to obtain toner particles having a volume-average particle size of 4.4 microns (measured by means of a Coulter counter equipped with a 100 micron-aperture).

10 wt. parts of the thus prepared polymerization toner was mixed with 0.3 wt. parts of zinc stearate powder, 0.3 wt. parts of hydrophobic silica (Aerosil R 972, mfd. by Nihon Aerosil K.K.), and 90 wt. parts of insulating carrier particles having an average particle size of 40 microns (obtained by using 75 wt. parts of triiron tetroxide and 25 wt. parts of epoxy resin) to prepare a developer.

Referring to FIG. 2, the electroconductive substrate roller 1 comprised a stainless steel substrate surfaced with a 0.5 mm-thick electroconductive rubber layer comprising a mixture of RTV-silicone rubber and electroconductive carbon, and had an inside diameter of 150 mm and an outside diameter of 180 mm. The photosensitive member 7 was caused to contact the above-mentioned electroconductive rubber layer under a contact pressure of 2 kg/cm$^2$.

By using the above-mentioned developer, a toner image was formed on the photosensitive member 7 and the toner image was transferred to the substrate roller 1 by using a corona charger (not shown). The toner image transferred to the substrate roller 1 for a printing plate was fixed thereto by means of a heating roller 8 comprising teflon at a fixing temperature of 120° C. under a pressure of 30 kg/cm$^2$.

Then, the photosensitive drum 7 was caused not to contact the electroconductive substrate 1 at a nip portion $N_1$, and the above-mentioned ink was provided between the electroconductive substrate 1 and an electroconductive member 37 by means of ink coating rollers 32 to 37 each of which comprised a 30 mm-diameter stainless steel cylindrical roller covered with platinum plating (surface roughness: 1S). Then, the electroconductive substrate 1 was rotated in the arrow A direction at a peripheral speed of 5 mm/sec.

When the printing operation was conducted while no voltage was applied from a DC power supply 38, printed matter having an image was not obtained. On the other hand, when printing operation was conducted while a DC voltage of 30 V was applied from the DC power supply 38, the ink selectively adhered to the insulating pattern of the electroconductive substrate 1, whereby a large number of printed sheets having sharp images of good quality were provided. In this instance, the electroconductive substrate 1 was used as the cathode, the ink coating roller 37 was used as the anode.

After a desired number of printed sheets were obtained, the toner image disposed on the surface of the substrate 1 was easily removed by means of a cleaner 6 comprising a web impregnated with a solvent. The web used herein was so controlled that it did not contact the substrate 1 at the time of printing and contacted the substrate 1 when the cleaning was required.

Example 2

| <Preparation of ink> | |
|---|---|
| Colloidal silicate hydrate (swelling fine particles, trade name: Sumecton, mfd. by Kunimine Kogyo K.K., average particle size: below 1 micron) | 250 wt. parts |
| Carbon black (Stering R, mfd. by Cabot Co., U.S.A.) | 60 wt. parts |
| Water | 140 wt. parts |
| Glycerin | 280 wt. parts |

Among the above-mentioned ingredients, water, glycerin and carbon black were first mixed by means of an attritor for 4 hours to prepare a mixture liquid, and then colloidal silicate hydrate was mixed therewith by means of a kneader to obtain an ink having the above-mentioned composition. The resultant ink had a volume resistivity of 1470 ohm.cm.

The thus obtained ink was applied onto a stainless steel plate or board of 1 cm×1 cm plated with platinum to form an about 2 mm-thick ink layer, and another stainless steel plate plated with platinum having the same size as described above was disposed on the ink layer. Then, these two stainless steel plates were disposed vertically. Under no voltage application, when the spacing between these two stainless steel plates was gradually increased to separate these two stainless steel plates from each other, it was found that the ink adhered to almost the entire areas of the respective plates.

Then, a voltage of +30 V was applied between the above-mentioned two stainless steel plates plated with platinum sandwiching the 2 mm-thick ink layer, while one of the stainless steel plate was used as a cathode (earth) and the another was used as an anode. When the spacing between these two stainless steel plates was gradually increased to separate these two stainless steel plates from each other, while applying the voltage in the above-mentioned manner, it was found that substantially all of the ink adhered to the anode while substantially no ink adhered to the cathode, when these electrodes were observed with the naked eyes.

Image formation

Figure 4:
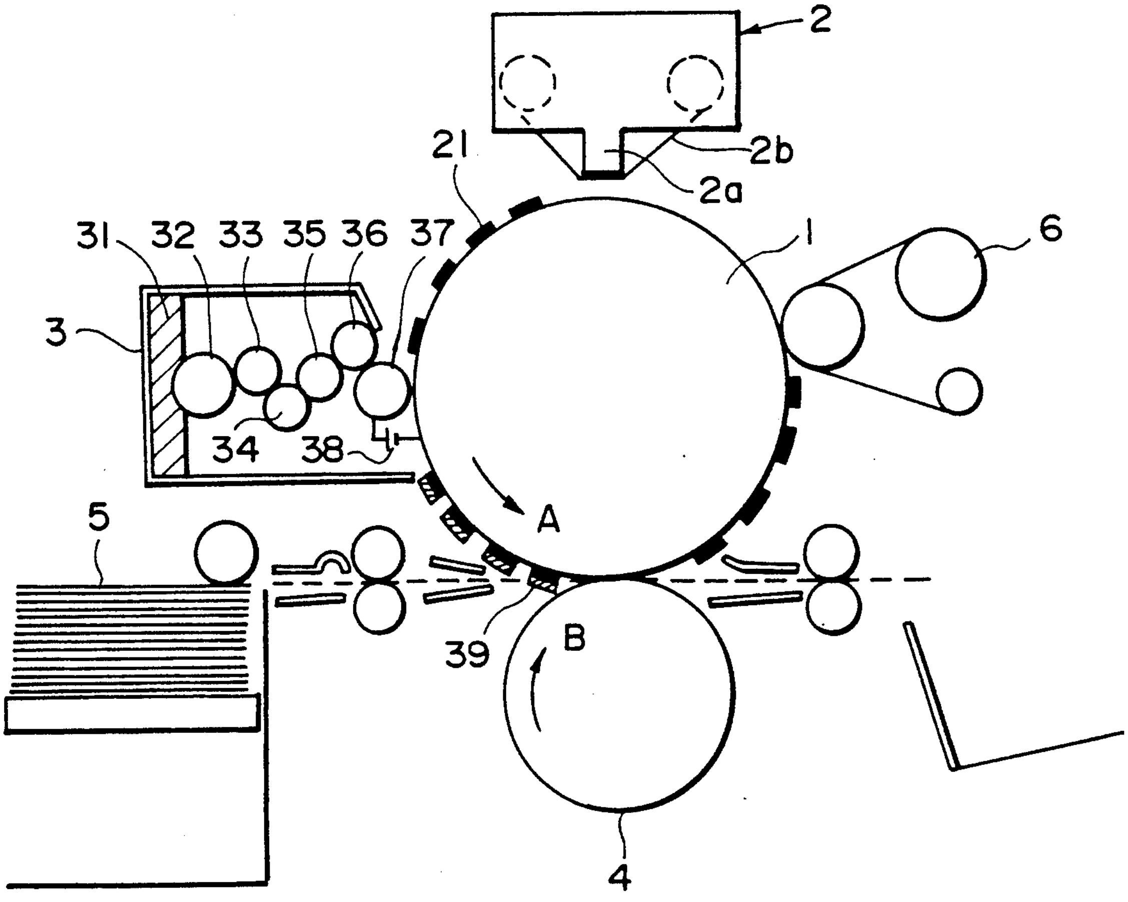

By using the above-mentioned ink, image formation was effected by means of an apparatus as shown in FIG. 4.

Referring to FIG. 4, the plate-forming means 2 comprised a conventional thermal transfer printer (PC-PR201, mfd. by Nihon Denki K.K.). More specifically, the thermal transfer recording medium **2*b* used therefor comprised a substrate and a coating of an insulating heat-fusible polymer disposed thereon which mainly comprised oxidized polyethylene resin, vinyl acetate resin and carbon black. A pattern of heat was applied to the thermal transfer recording medium 2*b* by means of a thermal head 2*a* thereby to form an insulating pattern 21 on an electroconductive substrate 1**.

The electroconductive substrate 1 used herein comprised a 300 mm-diameter copper roller surfaced with platinum plating and the ink coating roller 37 as an electroconductive member comprised a 30 mm-diameter stainless steel roller.

A voltage of 25 V was applied between the coating roller 37 (anode) and the electroconductive substrate 1 (cathode) by means of a DC power supply 38, while the electroconductive substrate 1 was rotated in the arrow A direction at a rotating speed of 10 mm/sec, whereby printing was effected on a transfer-receiving medium 5 of plain paper. As a result, a desired number of printed sheets having sharp images of good quality were obtained. In this instance, the ink selectively adhered to the insulating pattern 21 disposed on the electroconductive substrate 1.

After a desired number of printed sheets were obtained, the insulating pattern disposed on the surface of the substrate 1 was easily removed by means of a cleaner 6 comprising a web impregnated with a solvent.

What is claimed is:

1. An image forming apparatus comprising:
an electroconductive substrate;
an electroconductive member disposed opposite to the electroconductive substrate;
plate-forming means for forming an insulating pattern on the electroconductive substrate;
means for providing a recording material between the electroconductive substrate and the electroconductive member, said recording material being capable of changing its adhesiveness corresponding to the polarity of a voltage applied thereto; and
means for applying a voltage between the electroconductive substrate and the electroconductive member.

2. An apparatus according to claim 1, which further comprises means for transferring the recording material patternwise attached to the electroconductive substrate to a transfer-receiving medium.

3. An apparatus according to claim 1, wherein the recording material has a property such that it selectively adheres to the insulating pattern formed on the electroconductive substrate when a voltage is applied between the electroconductive substrate and the electroconductive member.

4. An apparatus according to claim 1, wherein said recording material has a property such that it selectively adheres to a portion of the electroconductive substrate other than the insulating pattern formed thereon when a voltage is applied between the electroconductive substrate and the electroconductive member.

5. An apparatus according to claim 1, which further comprises a cleaner for removing the insulating pattern from the electroconductive substrate.

6. An apparatus according to claim 1, wherein said recording material has a property such that it has an adhesiveness under no voltage application, but it decreases the adhesiveness to at least one of the electroconductive substrate and the electroconductive member, when a voltage is applied between the electroconductive substrate and the electroconductive member.

7. An apparatus according to claim 6, wherein said recording material has a property such that it has an adhesiveness under no voltage application, but when a voltage is applied between the electroconductive substrate and the electroconductive member, it generates a gas on at least one side of the electroconductive substrate and the electroconductive member to decrease its adhesiveness to either one of the electroconductive substrate and the electroconductive member at which a larger amount of the gas is generated.

8. An image forming method comprising the steps of:
forming an insulating pattern on an electroconductive substrate thereby to prepare a printing plate;
providing a recording material between the electroconductive substrate and an electroconductive member disposed opposite to the electroconductive substrate, said recording material being capable of changing its adhesiveness corresponding to the polarity of a voltage applied thereto;
applying a voltage between the electroconductive substrate and the electroconductive member to attach the recording material to either one of the electroconductive substrate and the electroconductive member thereby to form thereon a pattern of the recording material corresponding to the insulating pattern; and
transferring the pattern of the recording material formed on the electroconductive substrate or electroconductive member to a transfer-receiving medium.

9. A method according to claim 8, wherein said recording material is attached in a layer amount to either one of the electroconductive substrate and the electroconductive member, thereby to form thereon a pattern of the recording material.

10. A method according to claim 8, which further comprises a step of removing the insulating pattern from the electroconductive substrate.

11. A method according to claim 8, wherein said recording material has a property such that it has an adhesiveness under no voltage application, but it decreases its adhesiveness to at least one of the electroconductive substrate and the electroconductive member, when a voltage is applied between the electroconductive substrate and the electroconductive member.

12. A method according to claim 11, wherein said recording material has a property such that it has an adhesiveness under no voltage application, but when a voltage is applied between the electroconductive substrate and the electroconductive member, it generates a gas on at least one side of the electroconductive substrate and the electroconductive member to decrease its adhesiveness to either one of the electroconductive substrate and the electroconductive member at which a larger amount of the gas is generated.

13. A method according to claim 8, wherein said recording material has a property such that it selectively adheres to the insulating pattern formed on the electroconductive substrate, when a voltage is applied between the electroconductive substrate and the electroconductive member.

14. A method according to claim 8, wherein said recording material has a property such that it selectively adheres to a portion of the electroconductive substrate other than the insulating pattern formed thereon, when a voltage is applied between the electroconductive substrate and the electroconductive member.

* * * * *

UNITED STATES PATENT AND TRADEMARK OFFICE
CERTIFICATE OF CORRECTION

PATENT NO. : 5,019,835

DATED : May 28, 1991

INVENTOR(S) : ARAHARA ET AL.

It is certified that error appears in the above-identified patent and that said Letters Patent is hereby corrected as shown below:

COLUMN 2

Line 48, "FIGS. 1 are" should read --FIGS. 1 to 4 are--.

COLUMN 10

Line 33, "carrageenah" should read --carrageenan--.

COLUMN 12

Line 11, "may comprises" should read --may comprise--; and

Line 46, "carrageenah" should read --carrageenan--.

Signed and Sealed this

Twenty-second Day of December, 1992

*Attest:*

DOUGLAS B. COMER

*Attesting Officer* | *Acting Commissioner of Patents and Trademarks*